United States Patent
Fujita et al.

(10) Patent No.: US 7,219,923 B2
(45) Date of Patent: May 22, 2007

(54) DEVICE FOR DETERMINING KIND OF LOAD ON SEAT, SEAT, AND BIO-SIGNAL DETECTOR

(75) Inventors: Etsunori Fujita, Hiroshima (JP); Hiroshi Nakahira, Hiroshima (JP); Yoshimi Enoki, Hiroshima (JP); Yumi Ogura, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 302 days.

(21) Appl. No.: 10/849,325

(22) Filed: May 19, 2004

(65) Prior Publication Data

US 2004/0245036 A1   Dec. 9, 2004

(30) Foreign Application Priority Data

May 21, 2003   (JP)   ............................. 2003-180296

(51) Int. Cl.
*B60R 21/016*   (2006.01)
(52) U.S. Cl. ..................... 280/735; 340/573.1; 701/45; 701/47
(58) Field of Classification Search ............. 340/573.1; 280/735; 701/45, 47
See application file for complete search history.

(56) References Cited

U.S. PATENT DOCUMENTS

| | | | | |
|---|---|---|---|---|
| 5,846,206 A * | 12/1998 | Bader | ........................ | 600/534 |
| 5,865,463 A * | 2/1999 | Gagnon et al. | ............. | 280/735 |
| 5,906,393 A * | 5/1999 | Mazur et al. | ............... | 280/735 |
| 6,161,891 A * | 12/2000 | Blakesley | ................ | 296/65.01 |
| 6,195,008 B1 * | 2/2001 | Bader | ........................ | 340/573.1 |
| 6,220,627 B1 * | 4/2001 | Stanley | ........................ | 280/735 |
| 6,290,255 B1 * | 9/2001 | Stanley et al. | .............. | 280/735 |
| 6,302,438 B1 * | 10/2001 | Stopper et al. | ............. | 280/735 |
| 6,450,957 B1 * | 9/2002 | Yoshimi et al. | ............. | 600/309 |
| 6,474,683 B1 * | 11/2002 | Breed et al. | ................ | 280/735 |
| 6,598,900 B2 * | 7/2003 | Stanley et al. | .............. | 280/735 |
| 6,653,577 B2 * | 11/2003 | Breed et al. | ................ | 177/144 |
| 6,809,643 B1 * | 10/2004 | Elrod et al. | .............. | 340/539.1 |
| 6,932,774 B2 * | 8/2005 | Nakatani et al. | ............ | 600/534 |
| 6,942,248 B2 * | 9/2005 | Breed et al. | ................ | 280/735 |
| 7,019,641 B1 * | 3/2006 | Lakshmanan et al. | ...... | 340/538 |
| 2004/0039509 A1 * | 2/2004 | Breed | .......................... | 701/45 |
| 2004/0215382 A1 * | 10/2004 | Breed et al. | .................. | 701/45 |
| 2005/0131607 A1 * | 6/2005 | Breed | .......................... | 701/45 |
| 2006/0217864 A1 * | 9/2006 | Johnson et al. | ............... | 701/45 |
| 2006/0244246 A1 * | 11/2006 | Breed et al. | ................ | 280/735 |

* cited by examiner

*Primary Examiner*—Paul N. Dickson
*Assistant Examiner*—Timothy Wilhelm
(74) *Attorney, Agent, or Firm*—Wolf Block Schorr & Solis-Cohen LLP; William H. Dippert

(57) ABSTRACT

There is provided a bio-signal detector to detect a heart rate and a respiratory rate so that the determination of a kind of a seat load placed on a seat can be made. That is, whether the seat load is a human or an object is determined, and if it is the human, then the physique size is determined to be small or large (the level of the physique size is determined). Accordingly, as compared with the means based only on a weight of the seat load, the determination result is highly reliable. Besides, with the use of the bio-signal detector, the discrimination between the human and the object is ensured. Moreover, a structure additionally including a weight sensor allows the determination of the physique size in more accurate manner.

9 Claims, 13 Drawing Sheets

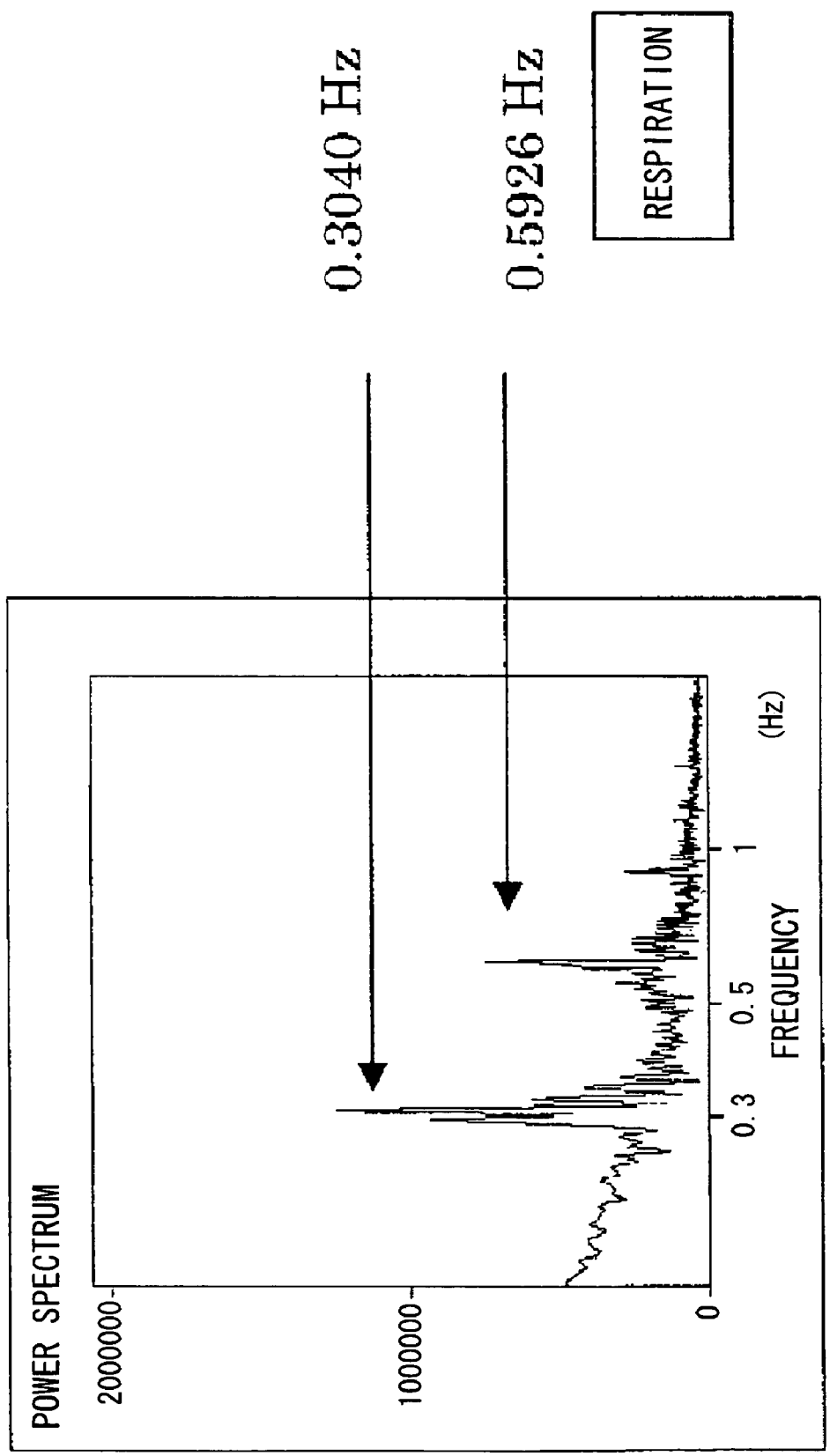

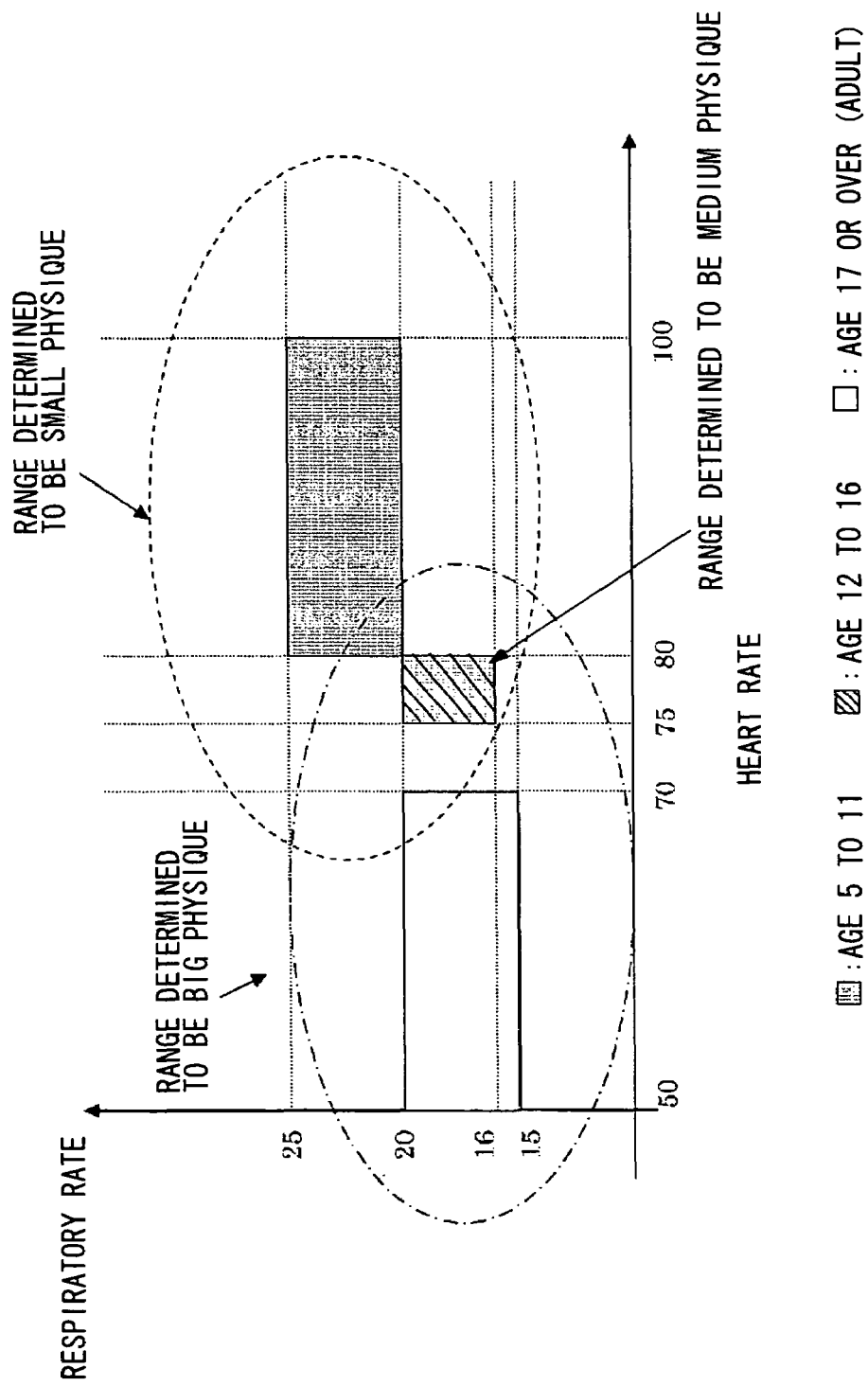

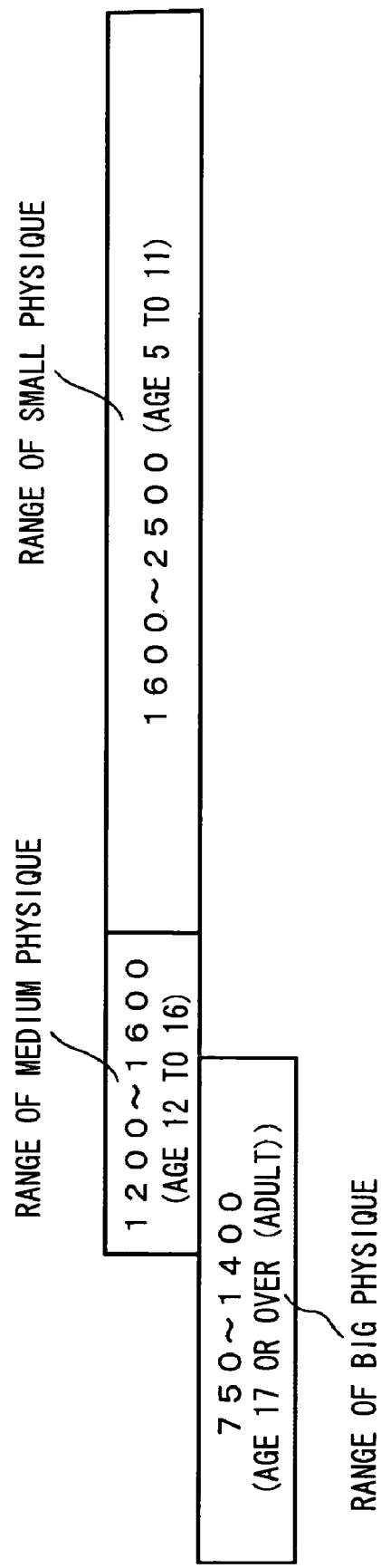

DEVICE FOR DETERMINING KIND OF LOAD ON SEAT, SEAT, AND BIO-SIGNAL DETECTOR

FIELD OF INVENTION

The present invention relates to a device for determining a kind of a load on a seat, in more detail, which determines whether the load placed on the seat is a human or an object, and if it is the human, then automatically determines whether the physique of the human is big or small; a seat; and a bio-signal detector.

BACKGROUND OF THE INVENTION

It is pointed out that an airbag of a vehicle has a potential for disturbing smooth breath if a passenger is for example a child and if the airbag is inflated. Also, it is pointed out that there is a potential to give a shock to a child who is seated on a child seat installed on a front passenger seat backward and if the airbag is inflated since the child seat is thereby pushed rearward. In addition to these problems, the airbag is devised to be equipped with an ON/OFF switch for controlling actuation of itself by turning on or off the switch.

However, actuations of conventional airbags are mostly placed under manual control as described above, which brings about no effect when failed to switch on or off when getting in the vehicle.

Also, such a technique is known that automatically determines whether a passenger seated on the seat is an adult or a child to feed the result back to an actuation control unit of the airbag for automatically switching the actuation control of the airbag. The conventionally proposed means uses a weight sensor which measures a displacement amount of a spring supporting a polyurethane foam used as a cushioning member and detects a weight based on the level of the displacement amount. Specifically, a threshold value in weight is predetermined and preset so that the load on the seat is determined to be the adult or the child by comparing the weight of the load on the seat with the threshold weight value. However, there are a light adults as well as a heavy children leaving a problem in reliability when depending only on the weight sensor for determining whether the occupant is an adult or a child. In addition, the actuation control of the airbag is required only for the child as described above, this is because the child has a small physique size in general. Therefore, preferably, actuation control of the airbag or the like is performed by taking account of the physique size, whether the physique size is an adult-level or a child-level, instead of just determining either the adult or the child. However, when such a determination is made only by the above-mentioned technique of detecting weight only, there is a problem in accuracy since an adult having a tall upper back and a light weight may be determined to be a child and vice versa.

In addition there is known another technique in the limited case where the child seat is installed backward in which a radio wave is sent from the child seat for controlling actuation of the airbag automatically. This is effective only when the child seat is thus installed but unable to control automatically when the child is seated directly on the seat.

Further, in the case where the load on the seat is not a human but an object, there is no need to inflate the airbag. For example, when the vehicle crashes and the airbag is inflated only for the object just placed on the front passenger seat, unnecessary repair costs are required. However, conventionally, no means is known for automatically determining whether the load over the predetermined weight placed on the seat is of the human or the object. Even a means employing the above-described weight sensor is difficult to control the actuation of the airbag since the means determines an object having the predetermined weight to be the adult, as an example.

SUMMARY OF THE INVENTION

The present invention is made in view of the above-stated considerations, and an object of the present invention is to provide a device for determining a kind of a load on a seat. Another object of the present invention is to provide a seat capable of discriminating between a small physique size and a big physique size, namely a physique size of a child level and a physique size of an adult level, automatically and more accurately than ever with regard to the load on the seat which weights the seat, and that, capable of discriminating between a human body and an object.

Specifically, according to the present invention, a device for determining a kind of a load on a seat, which is composed of a bio-signal detector provided to the seat for detecting a bio-signal from the load on the seat, and a bio-signal analyzer provided with a calculation means for calculating a heart rate and a respiratory rate based on the bio-signal obtained by the bio-signal detector and a comparative determination means for comparatively determining the kind of the load on the seat by comparing the heart rate and the respiratory rate obtained by the calculation means with a criterial heart rate and a criterial respiratory rate, is provided.

According to the present invention a device for determining the kind of load on the seat, in which the comparative determination means includes a means for comparatively determining whether the load on the seat is a human or an object, and a means for comparatively determining whether the physique size is big or small when the load on the seat is determined to be the human, is provided.

According to the present invention, a device for determining the kind of load on the seat in which the calculation means of the bio-signal analyzer is a means for performing a frequency analysis on the bio-signal obtained by the bio-signal detector and calculating the heart rate and the respiratory rate based on a power spectrum obtained by the frequency analysis, is provided.

According to the present invention a device for determining the kind of load on the seat, further composed of a weight sensor provided thereto for detecting a weight of the load on the seat, in which the comparative determination means compares the weight of the load on the seat obtained by the weight sensor with a criterial weight to comparatively determine a size of a body based on the weight as a comparison element together with the heart rate and the respiratory rate to comparatively determine the size of the body, is provided.

According to the present invention a device for determining the kind of load on the seat, in which the bio-signal detector is a pressure sensor, is provided.

According to the present invention a device for determining the kind of load on the seat in which the weight sensor is a strain gauge for measuring a displacement amount of a cushioning member which is displaced according to the weight of the load on the seat.

According to the present invention a device for determining the kind of load on the seat in which the device for determining the kind of load on the seat is structured to output a signal for controlling actuation of an airbag from an output means when the load on the seat is determined to be the object or the human of a small physique size, is provided.

According to an alternate embodiment of the present invention 8, a seat composed of a cushioning member provided with such a bio-signal detector that detects from a load placed on the seat a bio-signal to be a calculation element of a heart rate and a respiratory rate is provided.

According to the present invention a seat in which the bio-signal detector detects the bio-signal to be the calculation element of the heart rate and the respiratory rate for use in comparative determination of a kind of the load placed on the seat, is provided.

According to the present invention a seat in which the cushioning member for composing a seat cushion or a seat back is made from a tension structure causing a difference in tension depending on presence or absence of the load on the seat, and in which the bio-signal detector is mounted on a reverse surface of the cushioning member as the tension structure, is provided.

According to the present invention a seat further composed of a weight sensor for detecting a weight of the load on the seat is provided.

According to the present invention a seat in which the bio-signal detector is a pressure sensor, is provided.

According to the present invention a seat in which the weight sensor is a strain gauge for measuring a displacement amount of the cushioning member which is displaced according to the weight of the load on the seat, is provided.

According to an additional embodiment the present invention a bio-signal detector used by being provided to a cushioning member composed of a pressure sensor for detecting a pressure fluctuation caused by a heart beat and a respiration of a load on a seat which are transmitted via the cushioning member, is provided.

According to a further embodiment the present invention a bio-signal detector used by being mounted on a reverse surface of a cushioning member which composes a seat cushion or a seat back and is a tension structure causing a difference in tension depending on presence or absence of a load on a seat composed of a pressure sensor for detecting a pressure fluctuation caused by a heart beat and a respiration of the load on the seat which are transmitted via the cushioning member, is provided.

BRIEF DESCRIPTION OF THE DRAWINGS

The foregoing and still other objects and advantages of the present invention will be more apparent from the following detailed explanation of the preferred embodiments of the invention in connection with the accompanying drawings.

FIG. 8 is a graphic chart showing a result of the frequency analysis of the measurement data of respiration in FIG. 7;

FIG. 9 is a view showing example average values of the heart rate and the respiratory rate to be set in the bio-signal analyzer as one criterial data;

FIG. 10 is a view showing the criterial data in FIG. 9 with products of the heart rate and the respiratory rate;

DETAILED DESCRIPTION OF THE INVENTION

Figure 1:
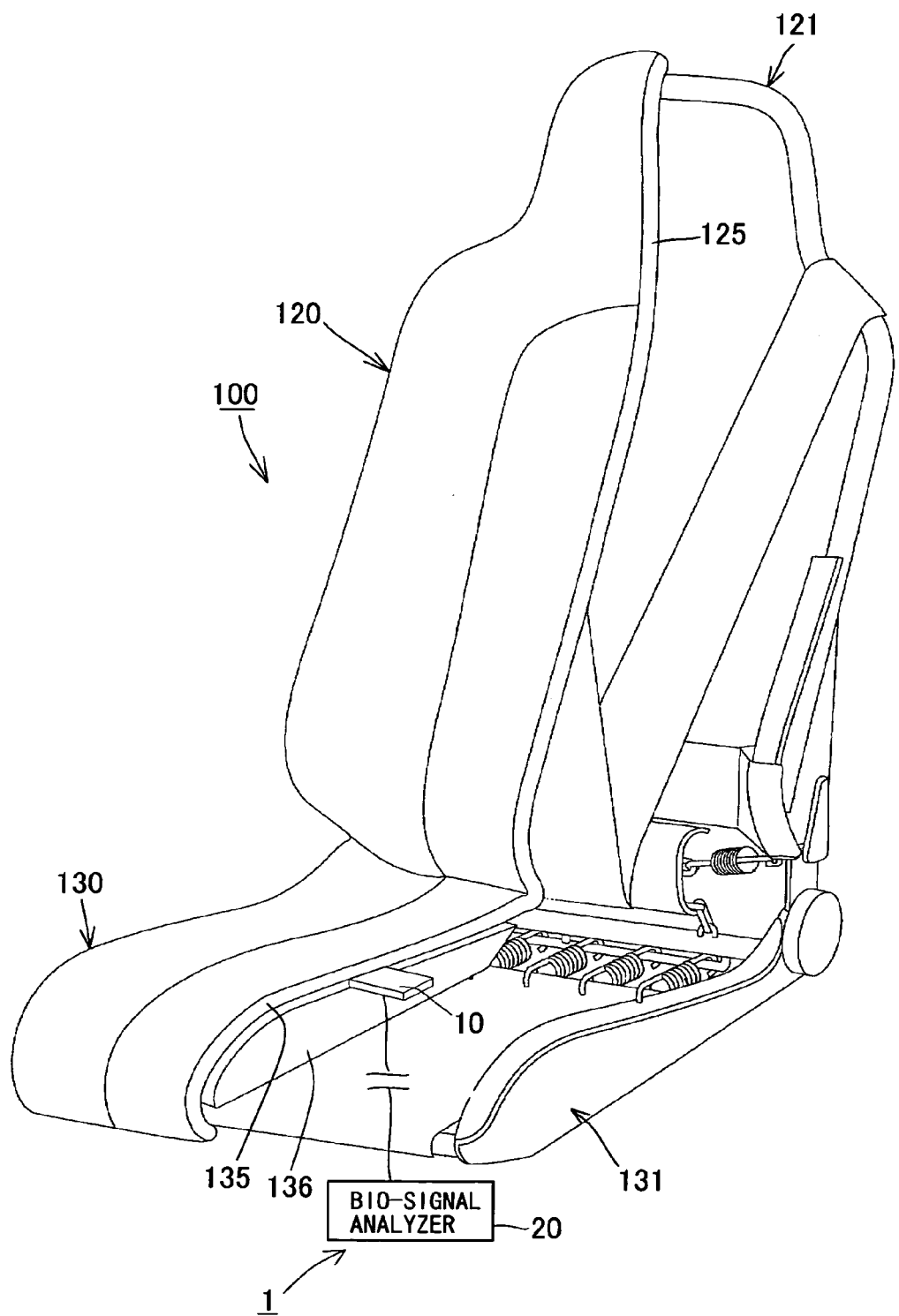
FIG. 1 is a view showing a device for determining a kind of a load on a seat according to a first embodiment of the present invention and the seat for mounting the device for determining the kind of the load on the seat therein.

Hereinafter, the present invention will be described in more detail according to embodiments shown in drawings. FIG. 1 is a view outlining a structure of a device for determining a kind of a load on a seat 1 (hereinafter "seat load determination device 1") according to a first embodiment of the present invention, the seat load determination device 1 being composed of a bio-signal detector 10 provided to a seat 100 and a bio-signal analyzer 20 for receiving a bio-signal data gathered by the bio-signal detector 10.

As a bio-signal detector 10, a pressure sensor can be used. However, the same is used by being mounted in at least one of a seat back or a seat cushion and is therefore required not to give a feeling of something foreign to a person seated, so that it is preferable to use a film-shaped piezoelectric element as a pressure sensor. As a pressure sensor, for example, the following can be used: product name, PIEZO FIM LDT series, model number, LDT4-028K/L, by Tokyo Sensor Co., Ltd.

Here, the seat 100 in which the bio-signal detector 10 is mounted is not limited but has a problem in appearance when the bio-signal detector 10 is installed on the surface of the cushioning member, and whereby the person tends to have a feeling of something foreign. Therefore, a cushioning member 125 or 135 composing a seat back 120 or a seat cushion 130 respectively on which the bio-signal detector 10 is mounted is preferably a tension structure causing difference in tension between presence and absence of a load on a seat (hereinafter referred to as a "seat load"), in other words, between when someone is seated and when no one is seated. For instance, such a material as spreadable over frame member 121 or 131 is preferable. With the use of the cushioning member 125 or 135 made from such a tension structure, a delicate pressure fluctuation caused by a human respiration or heart beat can be transmitted via muscles to the cushioning member 125 or 135, allowing to collect the bio-signal even when the bio-signal detector 10 is mounted on a reverse surface of the cushioning member 125 or 135. It should be noted that the tension structure can be provided in any manner as long as it is provided to cause the difference in tension depending on presence or absence of the seat load, and the tension structure is not limited to the case where it is spread over the frame member but, for example, the case where wire members are disposed on the polyurethane foam in the width direction with a space therebetween and a cushioning member is provided as the tension structure by being spread over the wires, is also acceptable.

Additionally, the cushioning members 125 and 135 for forming the tension structure can be made from a two-dimensional net member, a thin-type polyurethane, and the like. However a three-dimensional net member (solid knitted fabric) is preferably used. The solid knitted fabric is knitted by shuttling a connecting fiber between a pair of ground knitted fabrics at predetermined intervals using for example a Double Raschel knitting machine and the like. With the solid knitted fabric being formed as the tension structure, the net member can realize required cushioning effect sufficiently even if it is of a thin-type, so that the net member can transmit via muscles the delicate pressure fluctuation arisen from the human heart beat and respiration sensitively.

It should be noted that the cushioning member 125 or 135 provided as the tension structure is allowed to have another cushioning layer on the reverse surface thereof if required. For instance, in the embodiment shown in FIG. 1, there is disposed another cushioning layer 136 made from the polyurethane foam on the reverse surface side of the cushioning member 135 of the seat cushion 130, so that the bio-signal detector 10 mounted on the reverse surface of the cushioning member 135 is sandwiched between the same and another cushioning layer 136 made from the polyurethane foam. With such another cushioning layer 136 being provided, a feeling of a stroke when having a seat-down is assisted, and vibration absorption characteristics is improved as well as a feeling of something foreign due to the bio-signal detector 10 is further facilitated.

Figure 2:
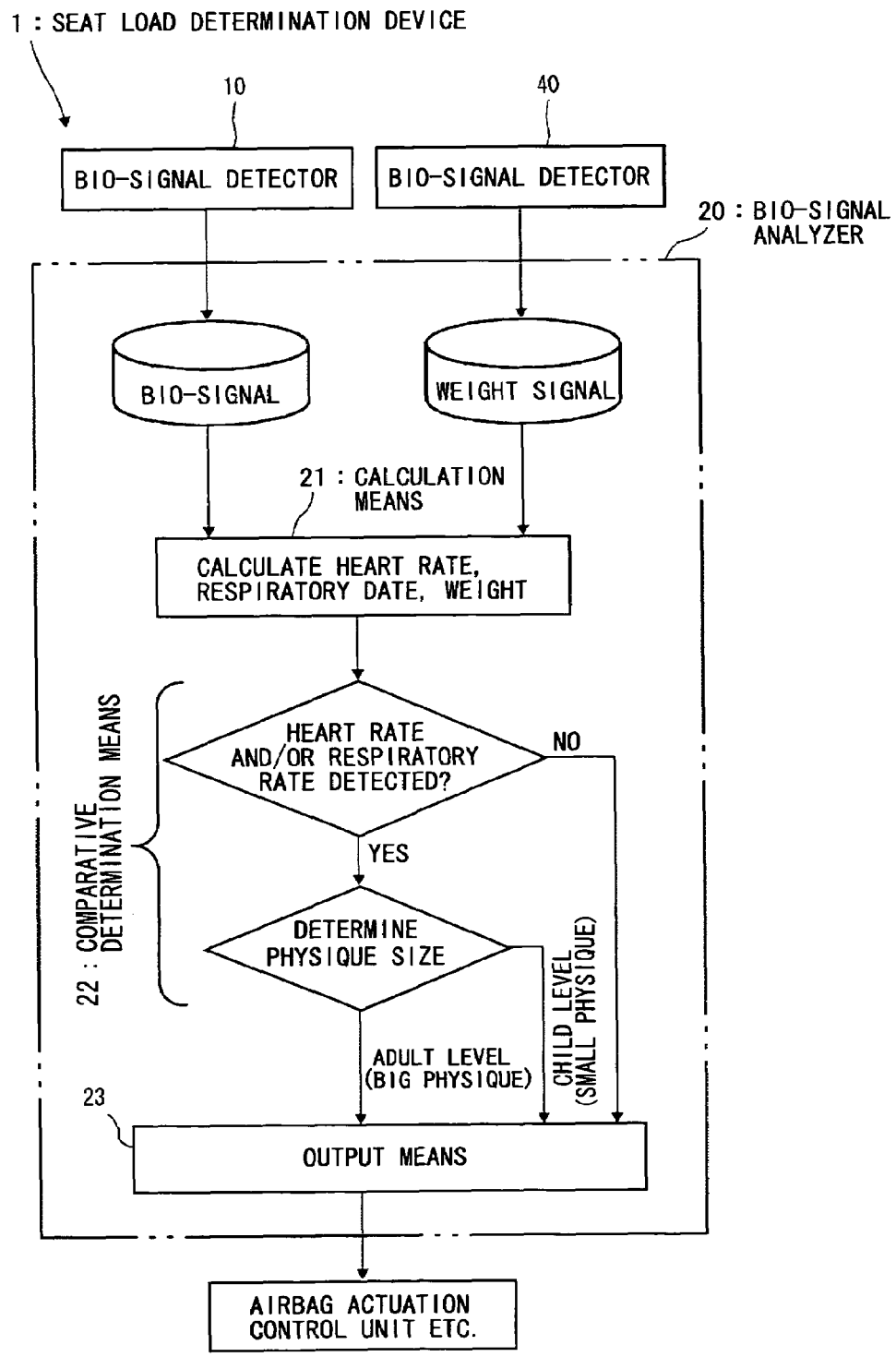
FIG. 2 is a block diagram showing the device for determining the kind of the load on the seat according to the above-mentioned embodiment.

A bio-signal analyzer 20 is connected with the above-mentioned bio-signal detector 10 via a signal cable or a radio, and is structured to include a calculation means 21 and a comparative determination means 22 as shown in FIG. 2.

The calculation means 21 includes a program which processes a bio-signal data sent from the bio-signal detector 10 to thereby compute a heart rate and a respiratory rate. Specifically, there are included steps for performing a frequency analysis of a bio-signal data when received the data and for calculating the heart rate and the respiratory rate based on a power spectrum obtained by the frequency analysis. Incidentally, an original signal of the bio-signal data contains noise, therefore, the frequency analysis is preferably performed after a preprocessing such as a noise elimination. For instance, the original signal is smoothed with differentiation, a peak of waveform is made acute, noise is eliminated, and the like.

Figure 3:
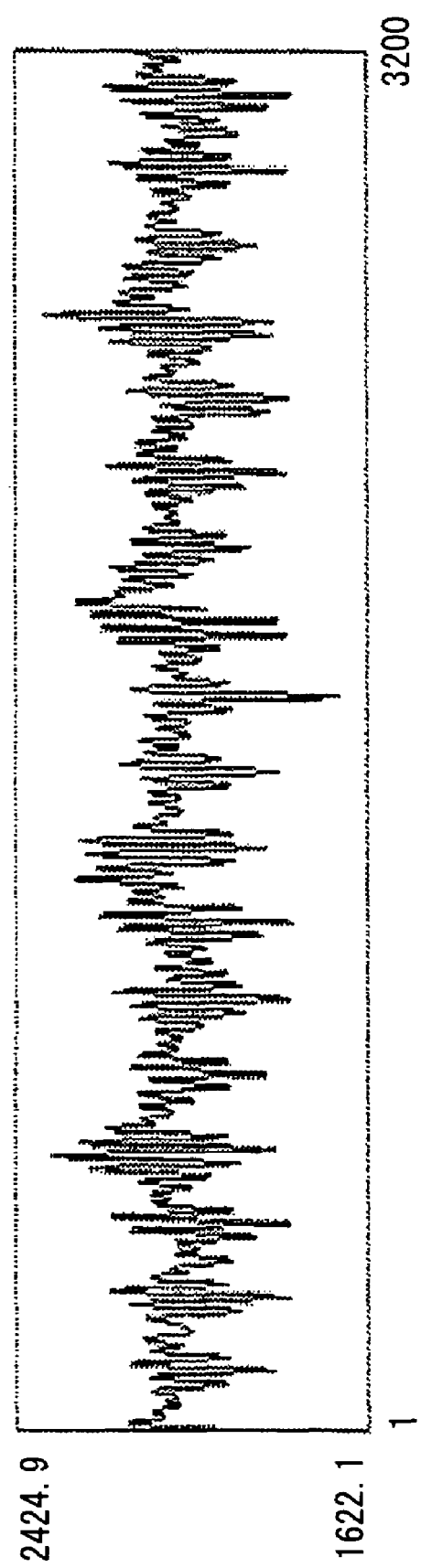
FIG. 3 is a graphic chart showing a bio-signal data obtained by a bio-signal detector.
Figure 4:
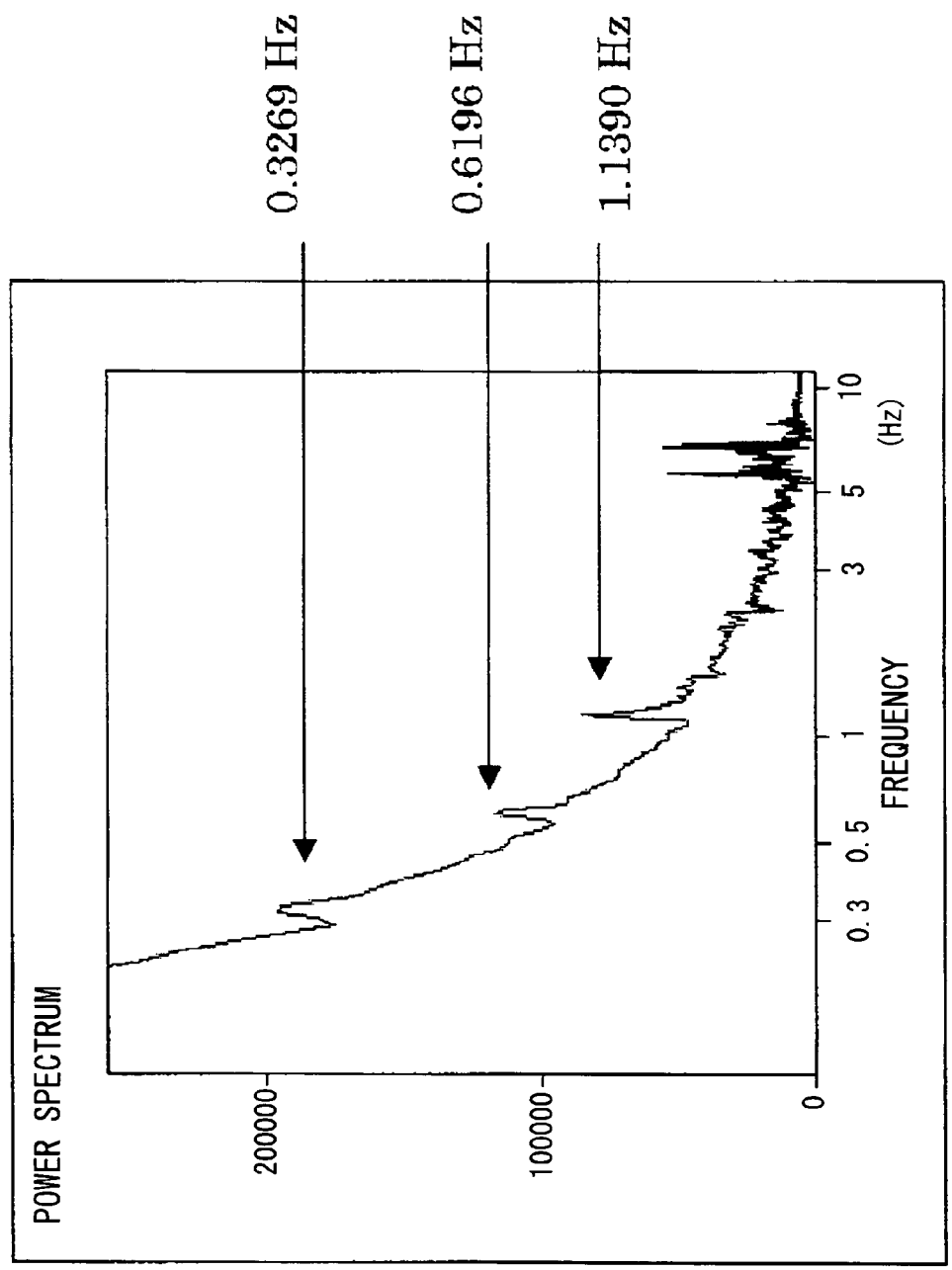
FIG. 4 is a graphic chart showing a result of a frequency analysis of the bio-signal data in FIG. 3.

FIG. 3 is a bio-signal data obtained by seating a subject (male, age 41, fine health condition) on seat 100 shown in FIG. 1 for 40 minutes, and FIG. 4 is the power spectrum obtained by the frequency analysis of this bio-signal data. The result of the frequency analysis in FIG. 4 shows that there are three characteristic peaks in the bio-signal data. Briefly, the peaks with frequencies of 0.3269 Hz, 0.6196 Hz, and 1.1390 Hz, respectively. Of the three peaks, the one of 1.1390 Hz indicates a pulse element, and the one of 0.3269 Hz indicates a respiration element. Note that the one of 0.6196 Hz indicates a respiration element as well, whereas it is not for use in conversion into the respiratory rate. Where 60 times the above-mentioned frequencies obtained by the power spectrum are the heart rate and the respiratory, respectively. In the case of the subject from whom the bio-signal data shown in FIG. 3 is collected, the heart rate is proved to be 68.3 and the respiratory rate is proved to be 19.6.

Here, with the purpose of confirming validity of the respiratory rate and heart rate obtained by the frequency analysis described above using the bio-signal data obtained with the bio-signal detector 10, which is composed of the pressure sensor as in this embodiment, being disposed on the reverse surface of the cushioning member 135 of the seat cushion 130, namely under haunches of a person, when conducting the above-described test, the pulse wave and respiratory rate of the subject are concurrently measured using an optical finger tip pulse wave detector and a respirometer, respectively. As an optical finger tip pulse wave detector and a respirometer, a "BACS-BC2000" (product name) by Computer Convenience Inc. and a "Respiration Pick-up TR-751T" (product name) manufactured by Nihon Kohden Corporation are used, respectively.

Figure 5:
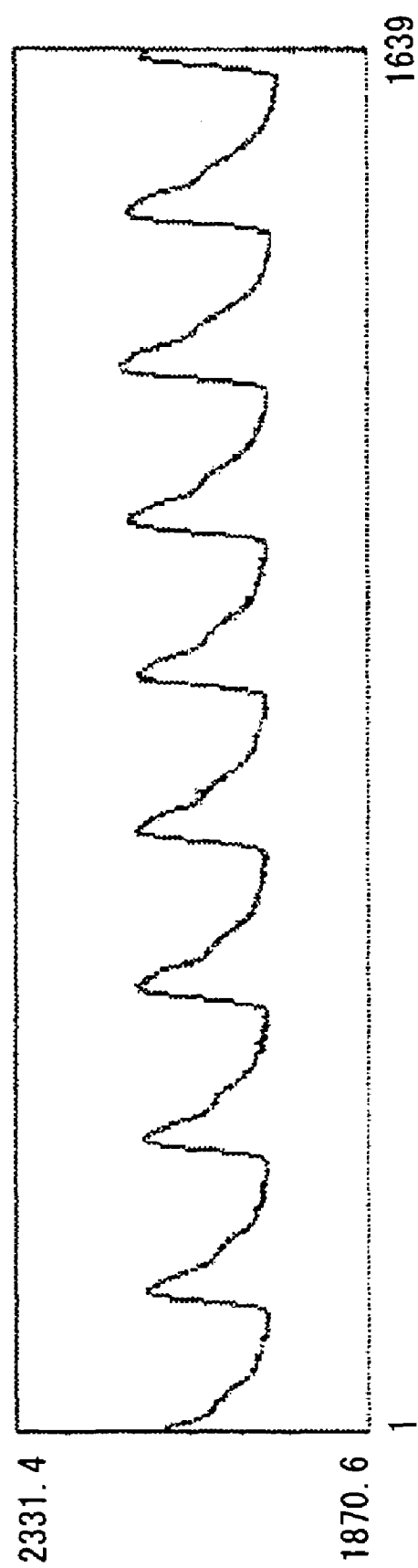
FIG. 5 is a graphic chart showing a measurement data of a pulse wave measured by an optical finger tip pulse wave detector.
Figure 6:
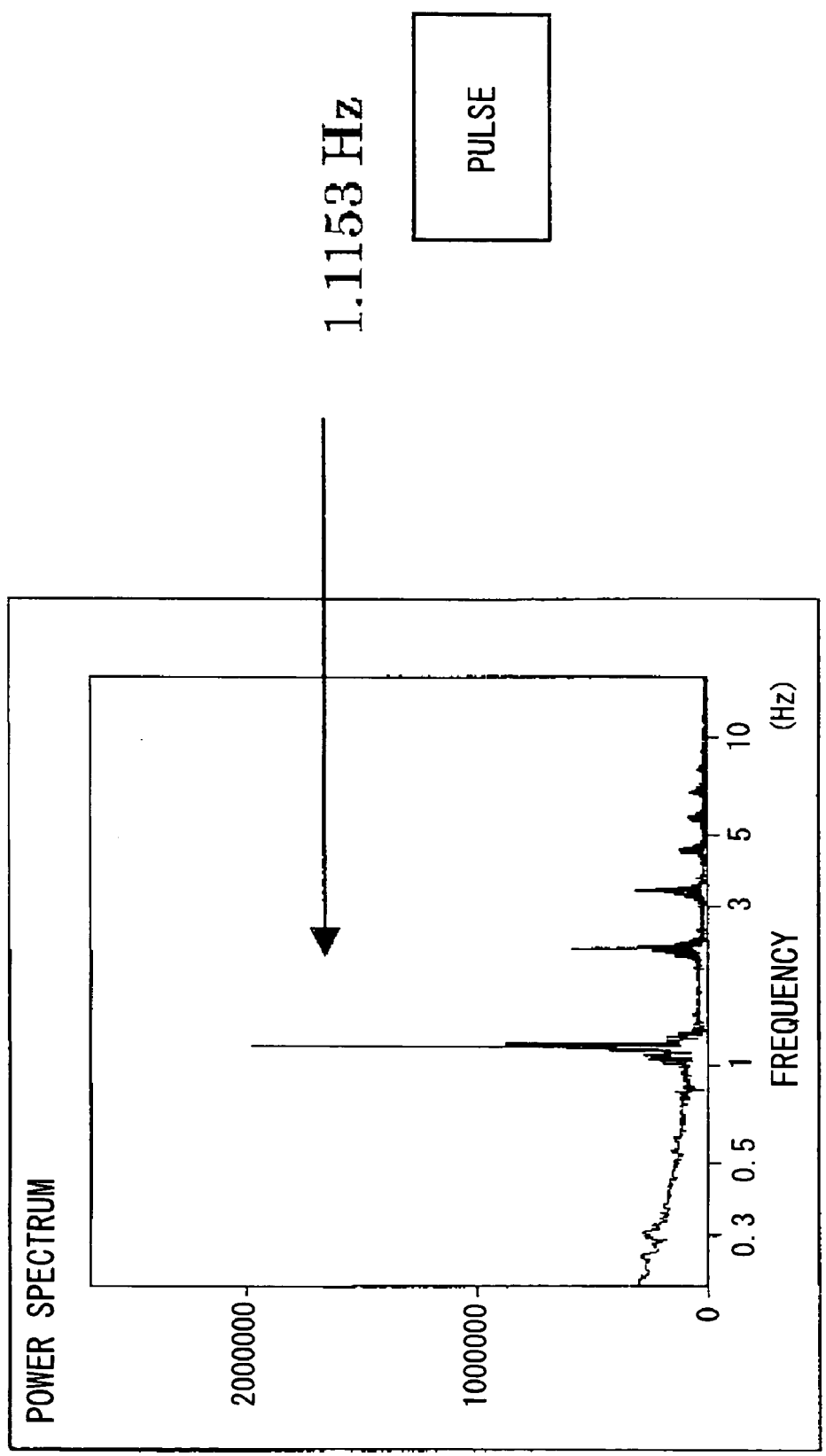
FIG. 6 is a graphic chart showing a result of the frequency analysis of the measurement data of the pulse wave in FIG. 5.
Figure 7:
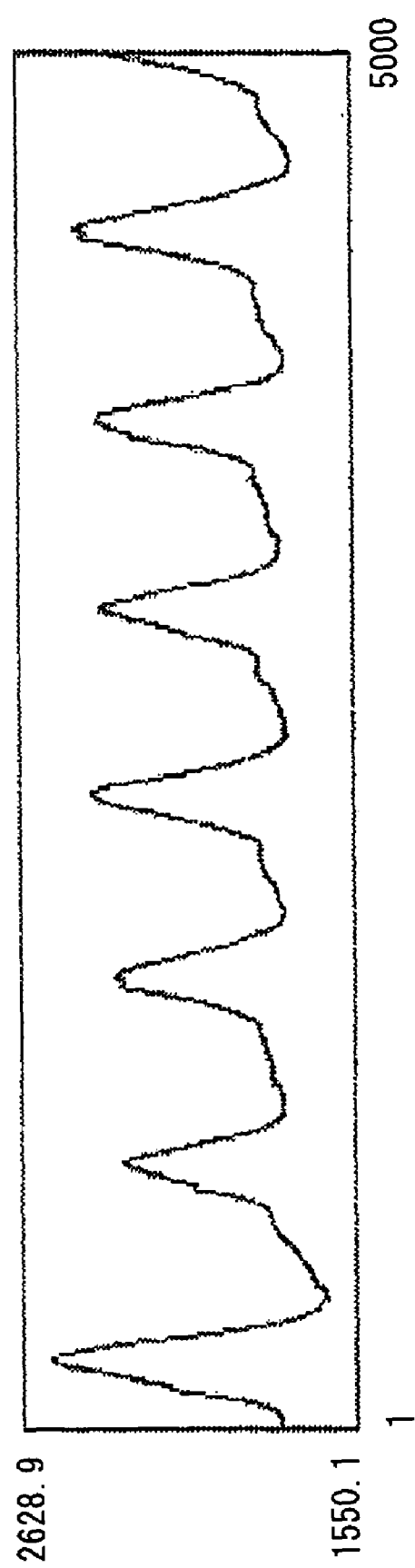
FIG. 7 is a graphic chart showing a measurement data of respiration measured by a respirometer.

FIG. 5 shows a signal detected by the optical finger tip pulse wave detector, FIG. 6 show a result of the frequency analysis thereof, FIG. 7 shows a signal detected by the respirometer, and FIG. 8 shows a result of the frequency analysis thereof. In FIG. 6, the peak of the pulse element is proved to have a frequency of 1.1153 Hz. In FIG. 8, the peak of the respiration element is proved to have a frequency between 0.3040 Hz and 0.5926 Hz. The above-described calculation made with these results brings about the heart rate of 66.9 and the respiratory rate of 18.2 respectively, which are essentially the same as those obtained by the computation based on the bio-signal data obtained by the bio-signal detector 10 in the present embodiment. It is learned herefrom that the bio-signal detector 10 composed of the pressure sensor according to the present embodiment is extremely effective as a sensor for collecting a bio-signal from a passenger of a vehicle including a driver.

In the comparative determination means 22, a comparison is made between the heart and respiratory rates obtained by the above-mentioned calculation means 21 and a criterial data of persons having an adult-level physique size (big physique) and a child-level physique size (small physique) to determine the physique size level (adult level or child level). In addition, when the calculation means 21 brings about no heart or respiratory rate data, namely when the calculation means 21 is not received bio-signal data from the bio-signal detector 10, the determination is made that there is an object or no seat load on the seat. It is possible to determine either an object or no seat load with the use of a weight sensor 40 described later, in which no weight is determined to be no seat load, and a weight is determined to be an object.

FIG. 9 is a view showing example data of persons having adult-level physique sizes (big physique) and persons having child-level physique sizes (small physique), and this data is to be preset in the comparative determination means 22 as a criterial data. FIG. 9 is compiled based on an average national school statistics in Japan and indicates that children have higher heart rate as well as respiratory rate and adults (age 17 or above) tend to have lower heart rate as well as respiratory rate. It is therefore possible to set so that a passenger having a heart rate of 75 or below and a respiratory rate of 25 or below is determined to be an adult-level physique size (big physique), that a passenger having a heart rate of 80 or above and a respiratory rate of 20 or above is determined to be a child-level physique size at an age of 5 to 11 (small physique), and that a passenger having a heart rate of 75 through 80 and a respiratory rate of 15 through 20 is determined to be a child-level physique size at an age of 12 to 16 (medium physique).

In regard to the heart rate and the respiratory rate, a child sometimes has a lower heart rate, and an adult sometimes has a higher heart rate and respiratory rate. However, by considering two reference values of the heart rate and respiratory rate which are highly correlate with the physique size as well, and by having a determination criterion as described above, it is possible to control an airbag and the like in accordance with the physique size level, and that accuracy thereof is superior to that of the conventional art in which an adult or a child is determined by measuring only weight. Incidentally, whether or not to provide a criterion for "medium physique" as described above is at will, yet, the criterion for "medium physique" allows finer control. For instance, a smaller development of an airbag or the like than that for "big physique" can be realized.

Further, for distinguishing the adult-level physique from the child-level physique in view of the heart rate and respiratory rate more accurate, products of respective heart rates and respiratory rates of the adult and the child compiled based on the average national school statistics in FIG. 9 can be set as the criterial data as shown in FIG. 10.

Further more, the criterial data to be set in the bio-signal analyzer 20 can be designed to have a structure recordable of heart beat and respiratory related data of a potential passenger of the vehicle such as a family member of the vehicle's owner. Generally, a passenger of a vehicle is relatively limited for example to the vehicle owner's family or the like, therefore, by adopting such a structure, the physique size of the passenger in the vehicle can be determined more accurate than the case adopting the national average data or the like, as the criterial data.

Figure 11A:
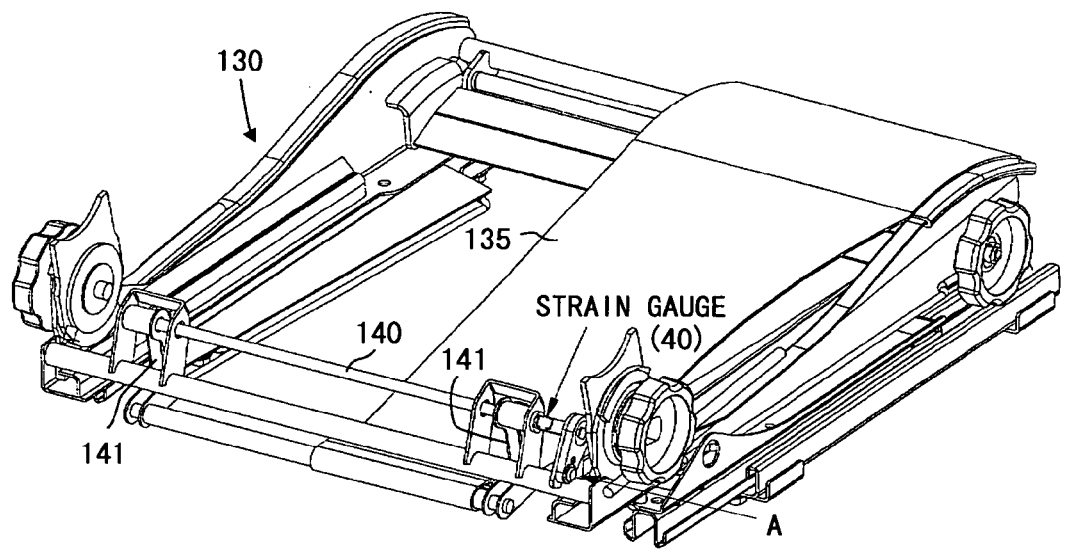
FIG. 11A is a view outlining a structure of a seat cushion with a strain gauge being mounted thereon as a weight sensor and FIG. 11B is a view detailing the portion pointed by an arrow A in FIG. 11A.
Figure 11B:
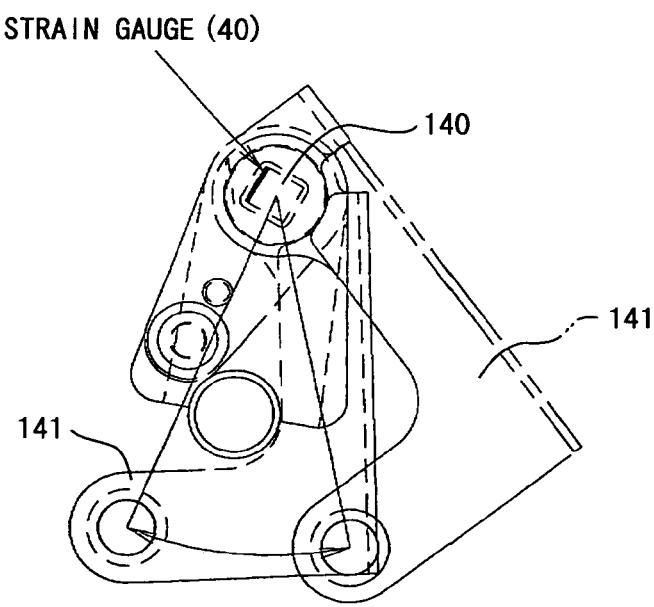

However, there exists a range unable to determine the physique size positively in the case of determining the level of the physique size using the heart rate and the respiratory rate. Therefore, it is preferable to additionally provide a weight sensor 40 for detecting a weight of the seat load so that the weight data can also be included. The weight sensor 40 is not limited, but it is preferable to use a strain gauge capable of detecting a displacement amount of the cushioning member which is changed according to the weight of the seat load. In order to detect the displacement amount of the cushioning member, the strain gauge is set so that the strain gauge detects a displacement amount of a spring mechanism supporting the cushioning member. For instance, as a case where the tension structure is used for the cushioning member 135 of the seat cushion 130, as shown in FIG. 11, there is a mechanism in which a torsion bar 140 is disposed at the rear end of the seat cushion 130 along therewith in the width direction, the torsion bar 140 being provided with an arm 141 to elastically support the cushioning member 135. In such a case, when a seat load is placed on the cushioning member 135, the torsion bar 140 is made twisted in accordance with the weight of the seat load. Accordingly, by mounting the strain gauge on the torsion bar 140 and by detecting a torsion angle of the torsion bar 140 as a distortion amount, the weight of the seat load can be measured easily and accurately.

In the case where the weight sensor 40 is provided, in the calculation means 21, a program for converting a detected signal obtained by the weight sensor 40 into a weight is set, and in the comparative determination means 22, a program for comparing the weight with a criterial weight for determining the physique sizes is set. Specifically, it is known that a load to be applied to a seat cushion when a person is seated thereon is approximately 0.8 times actual weight of the person minus a weight of his/her legs (averaged weight of adult legs: approximately 12 Kg). Therefore, the load data to be applied to the seat cushion is recorded as a criterial weight data and the comparison is made therewith.

Subsequently, a determination method of a seat load using the above-described seat load determination device 1 will be described.

First, as shown in FIG. 2, a bio-signal analyzer 20 receives and records, as a bio-signal, a pressure fluctuation data as shown in FIG. 3 sent from a pressure sensor composing a bio-signal detector 10. Similarly, the bio-signal analyzer 20 receives and records, as a weight signal, a distortion amount sent from a strain gauge composing a weight sensor 40.

Based on the bio-signal and the weight signal obtained, in a calculation means 21, a heart rate, a respiratory rate, and a weight of the seat load are calculated. The respective heart rate, respiratory rate, and weight data calculated by the calculation means 21 are compared by a comparative determination means 22 with a criterial data recorded in advance in the bio-signal analyzer 20 to determine the physique size and either a human or an object. At this time, the determination either the human or the object is made depending on presence or absence of the heart rate and/or the respiratory rate. In the case where it is determined to be the object, a signal indicating the fact is sent to an output means 23. In the case of the human, the data is compared with the criterial data in the comparative determination means 22 and the comparison result is sent to the output means 23.

Figure 12A:
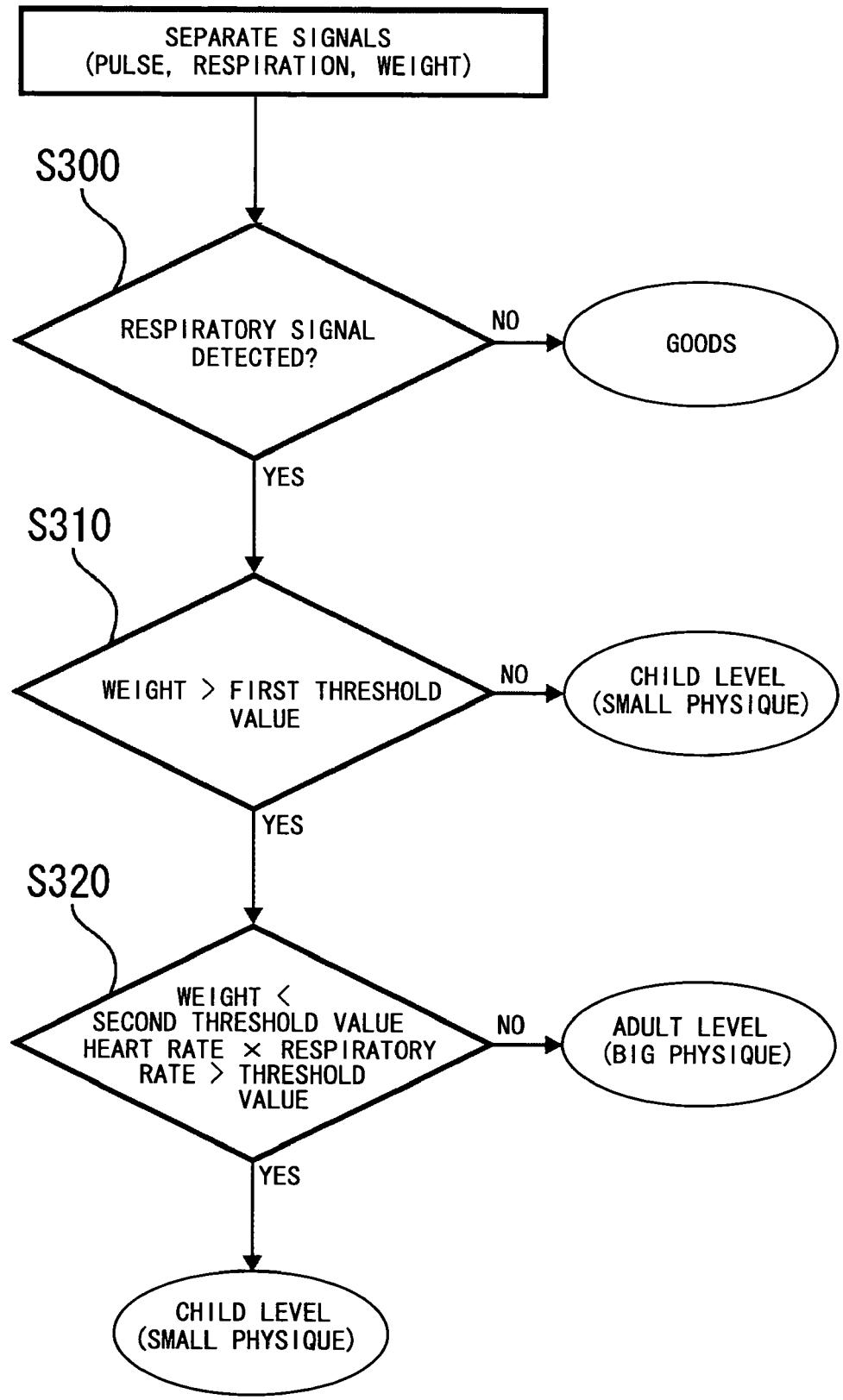
FIG. 12A and FIG. 12B are flowcharts showing example determination algorithms for the comparative determination means.
Figure 12B:
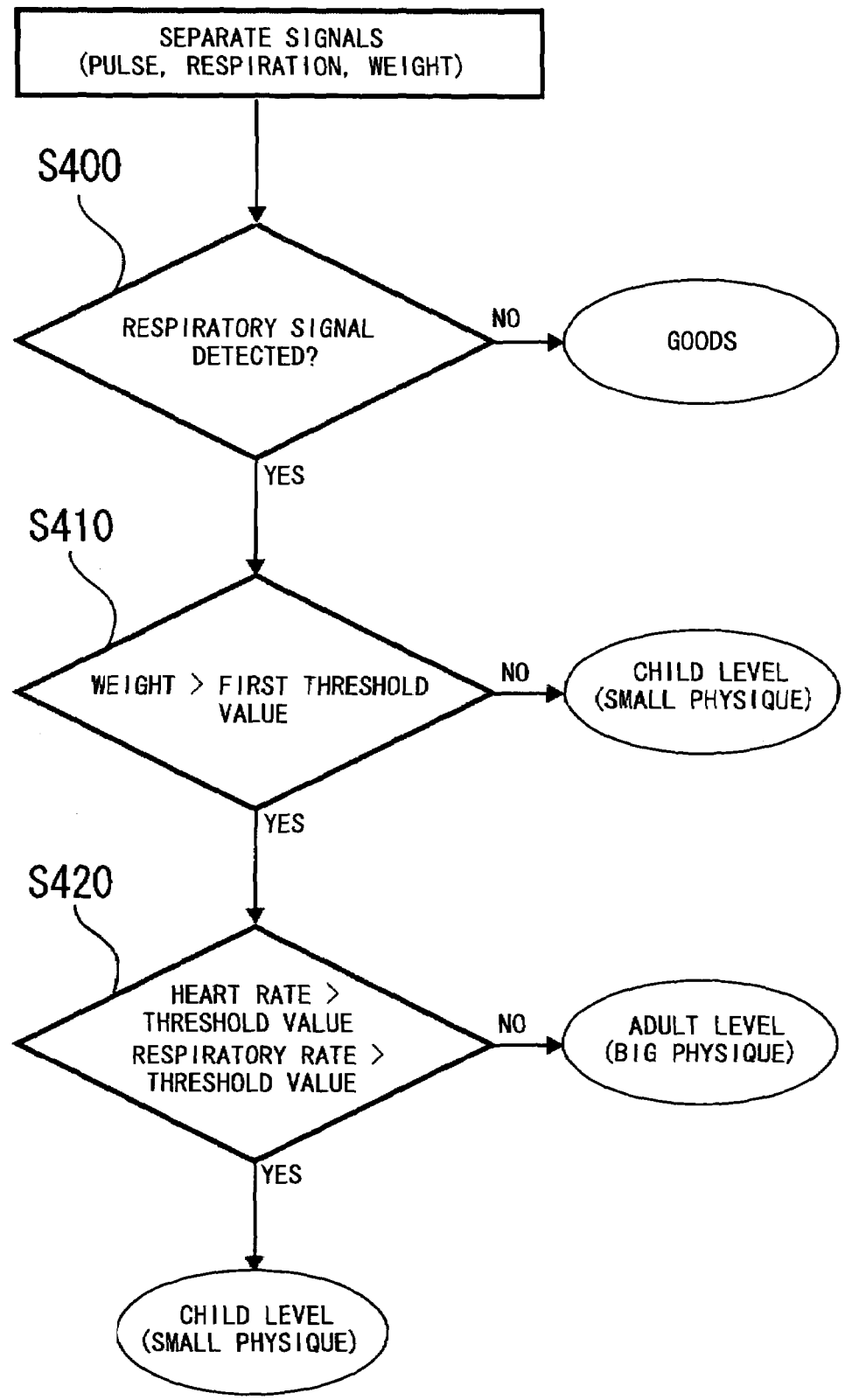

Here, an algorithm used in the comparative determination means 22 can be made as shown for example in FIGS. 12A and 12B. In FIG. 12A, first, depending on presence or absence of the respiratory signal, the determination of the human or the object is made (S300). Next, the determination of the physique size is made depending on whether the weight is over or below a first threshold value of the criterial data, and if the physique size is therebelow, it is determined to be "small physique" of a child level (S310). If the weight data is thereover, the determination is made depending on whether or not the weight exceeds a second threshold value and whether or not the product of the heart rate and the respiratory rate exceeds a threshold value set based on the criterial data, and if both of them are satisfied, it is determined to be a child-level ("small physique"), and if none of them is satisfied, it is determined to be an adult-level ("big physique") (S320).

In the case of the algorithm shown in FIG. 12B, first, depending on presence or absence of the respiratory signal, the determination of the human or the object is made (S400). Next, the determination of the physique size is made depending on whether or not the weight exceeds the threshold value of the criterial data, and if the physique data is therebelow, it is determined to be "small physique" of a child level (S410). If the weight data is thereover, the determination is made by comparing the heart rate and the respiratory rate with the threshold values respectively, and if they exceed, it is determined to be a child-level ("small physique"), and if they do not exceed, it is determined to be an adult-level ("big physique") (S420).

The determination result thus obtained is sent to the output means 23, and is sent to an actuation control unit of an airbag thereafter as shown for example in FIG. 2. In the actuation control unit of the airbag, when the determination result is "big physique" of an adult level, the airbag is controlled to be actuated normally, whereas, when the determination result is "small physique" of a child level, or the object, the airbag is controlled not to be developed. In the case of a child level, the control can be designed to control development level. A mechanism installed in a vehicle to be controlled by the seat load determination device 1 is not limited to control the actuation control unit of the airbag, but can control for example a pretensioner of a seat belt. Besides, in the algorithm shown in FIG. 12, the determination is made only to determine whether the physique size is "big physique" or "small physique", yet, an algorithm for determining "medium physique" therebetween can be added where more delicate development control of the airbag and the like can be enabled. "The determination of big physique or small physique" mentioned in this description does not mean a choice between the two physique sizes, but means to determine the level of the physique size.

In the above-described embodiment, the determination of a physique size, and a human or an object are made based on a heart rate and a respiratory rate detected based on a bio-signal collected by a bio-signal detector 10, however, the bio-signal detector according to the present invention can also be used to determine a state of a living body, for example, by analyzing a chaos characteristic based on the detected heart rate and respiratory rate.

According to the present invention, there is provided a bio-signal detector to detect a heart rate and a respiratory rate so that the determination of a kind of a seat load placed on a seat can be made. That is, whether the seat load is a human or an object is determined, and if it is the human, then the physique size is determined to be small or large (the level of the physique size is determined). Accordingly, as compared with the means based only on a weight of the seat load, the determination result is highly reliable. Besides, with the use of the bio-signal detector, the discrimination between the human and the object is ensured. Moreover, a structure additionally including a weight sensor allows the determination of the physique size in more accurate manner.

What is claimed is:

1. A device for determining a kind of a load on a seat, comprising:
    a bio-signal analyzer receiving and analyzing a bio signal and a weight signal of the load on the seat detected by a bio-signal detector and a weight sensor, respectively, the bio-signal detector and the weight sensor being provided on the seat,
    wherein said bio-signal analyzer includes:
        a calculation means calculating a heat rate, a respiratory rate and a weight respectively of the load on the seat based on the bio signal obtained by the bio-signal detector and the weight signal obtained by the weight sensor;
        a comparative determine means to comparatively determine the kind of the load on the seat from the heart rate, the respiratory rate and the weight obtained by the calculations means, and to comparatively determine a size of a physique when the load on the seat is determined to be a human, and
    wherein said comparative determination means is provided with:
        a first determination step determining whether the load on the seat is a human or an object based on presence or absence of the respiratory rate,
        a second determination step determining, when the load on the seat is determined to be a human, the size of the physique by comparing the weight with a critical threshold value of a weight set previously; and
        a third determination step determining the size of the physique using at least the heart rate and the respiratory rate from the calculation means when the weight is determined to exceed the threshold value of the criterial weight in the second determination step.

2. The device for determining the kind of the load on the seat according to claim 1,
    wherein, said second determination step is provided with a step of comparing the weight with the threshold value of the critical weight set previously to determine the physique size to be a "small physique size" when the weight does not exceed the threshold.

3. The device for determining the kind of the load on the seat according to claim 2,
    wherein, said third determination step of the comparative determination means further comprises the step of comparing the weight obtained from the calculation means with a second threshold value being heavier than the first threshold value used in the second determination step when the weight is determined to exceed the first threshold value of the criterial weight in the second determination step, and, comparing a product of the heart rate and the respiratory rate set with a criterial threshold value of the product of the heart rate and the respiratory rate set previously; and when the weight exceeds the second threshold value, and at the same time, the product of the heart rate and the respiratory rate is below the criterial threshold value, the physique size is determined to be a "big physique size" and when the weight is below the second threshold value, and at the same time, the product of the heart rate and the respiratory rate exceeds the criterial threshold value, the physique size is determined to be a "small physique size".

4. The device for determining the kind of the load on the seat according to claim 2,
    wherein said third determination step of the comparative determination means is provided with the step of comparing the heart rate and the respiratory rate obtained from the calculation means with critical threshold values of the heart rare and the respiratory rate set previously, respectively, when the weight is determined to exceed the threshold value of the criterial weight in the second determination step, and when both the heart rate and the respiratory rate are below the criterial threshold value, the physique size is determined to be a "big physique size" and when they exceed the criterial threshold value, the physique size is determined to be a "small physique size".

5. The device for determining the kind of the load on the seat according to claim 1,
    wherein said calculation means of said bio-signal analyzer is a means performing a frequency analysis on the bio-signal obtained by said bio-signal detector and calculating the heart rate and the respiratory rate based on a power spectrum obtained by the frequency analysis.

6. The device for determining the kind of the load on the seat according to claim 1,
    wherein said bio-signal detector is a pressure sensor.

7. The device for determining the kind of the load on the seat according to claim 6,
    wherein a cushioning member for composing a seat cushion or a seat back of a seat is made from a tension structure causing a difference in tension depending on presence or absence of the load on said seat; and wherein said bio-signal detector is mounted on a reverse surface of the cushioning member as the tension structure.

8. The device for determining the kind of the load on the seat according to claim 1,
wherein and weight sensor is a strain gauge for measuring a displacement amount of a cushioning member which is displaced according to the weight of the load on the seat.

9. The device for determining the kind of the load on the seat according to claim 1,
wherein said device for determining the kind of the load on the seat is structures to output a signal controlling actuation of an airbag from an output means when the load on the seat is determined to be the object or the human of a small physique size.

* * * * *